United States Patent [19]

Joachimi

[11] Patent Number: 5,594,046

[45] Date of Patent: Jan. 14, 1997

[54] INTUMESCENT ONE-COMPONENT SEALANT

[75] Inventor: Roland Joachimi, Romanshorn, Switzerland

[73] Assignee: Bostik, Inc., Middleton, Mass.

[21] Appl. No.: 403,734

[22] PCT Filed: Sep. 15, 1993

[86] PCT No.: PCT/EP93/02494

§ 371 Date: May 3, 1995

§ 102(e) Date: May 3, 1995

[87] PCT Pub. No.: WO94/06886

PCT Pub. Date: Mar. 31, 1994

[30] Foreign Application Priority Data

Sep. 18, 1992 [DE] Germany .......................... 42 31 342.2

[51] Int. Cl.$^6$ .............................. C09K 21/14; B22C 1/22; C08J 3/00; C08L 75/00

[52] U.S. Cl. ........................ 523/179; 252/606; 427/154; 427/445; 523/142; 523/217; 524/196; 524/415; 524/416; 524/494; 524/589; 524/590

[58] Field of Search ..................... 523/142, 179, 523/217; 524/415, 416, 196, 494, 589, 590; 427/154, 445; 252/606

[56] References Cited

U.S. PATENT DOCUMENTS 4,529,742   7/1985   von Bonin et al. .................... 523/179

Primary Examiner—Paul R. Michl
Assistant Examiner—Patrick Niland
Attorney, Agent, or Firm—David G. Conlin; Peter F. Corless

[57] ABSTRACT

The invention relates to an intumescent one-component sealant based on polyurethane and containing an intumescent agent and a vitreous fusible filler. The intumescent agent and the vitreous filler have been pretreated by reaction with an isocyanate having a functionality of at least 2. The sealant is stable in storage and is an effective fire barrier in the event of fire.

15 Claims, No Drawings

INTUMESCENT ONE-COMPONENT SEALANT

The invention relates to an intumescent one-component sealant comprising a polyurethane binder, an intumescent agent and, if required, conventional additives, to a process for preparing such a sealant, and to the use thereof for sealing openings or joints in construction parts.

One- and two-component sealants based on polyurethane are often used as high-performance sealing materials in the construction industry, for example for the elastic sealing of settlement joints between prefabricated concrete elements. In the event of fire, the sealing material is generally not capable of preventing, as fire barrier, passage of the times through the joint for more than 20 minutes. Specially formulated sealants are therefore necessary to keep the joints closed for hours even in the event of fire.

It is already known, namely by EP-A-420302, that a composition of a polyurethane binder, an intumescent substance and glass frits as glass-like melting filler provides an intumescent material; this document however does not provide an indication about a preparation of the glass-like filler by means of an isocyanate.

In DE-A-3421086 it is described the reaction of an aqueous alcaline silicate solution with a polyisocyanate and a polyol. The reaction product however is a tridimensional crosslinked organomineral without the property of intumescence.

From DE-A-1118966 it is known a flame-resistant sealant composition which comprises a crosslinked polyurethane and a silicic acid filler which before crosslinking of the binder was dissolved, at least in colloidal state, in a fluid adduct of a component comprising OH- groups and an isocyanate. This composition however is not intumescent and the silicic acid was not prepared with an isocyanate alone.

JP-A-52/102395 describes a fire-resistant sealing composition made from a foamable polyurethane and an aqueous sodium silicate solution. However in this document can be found no mention of the addition of a glass-like melting filler prepared from an isocyanate to intumescent polyurethane sealing composition.

The purpose of the present invention is to provide intumescent one-component sealants which are in particular stable on storage and are an effective fire barrier in openings and joints of construction parts in the event of fire. A second objective of the present invention is to indicate a process for preparing a sealant of this kind.

The present invention therefore relates to an intumescent one-component sealant comprising a polyurethane binder and an intumescent agent and, if required, conventional additives, characterised in that it further contains a vitreous fusible filler and in that the intumescent agent and the vitreous filler have been subjected to a pretreatment by reaction with an isocyanate having a functionality of at least 2.

The polyurethane binder used in the sealant according to the invention is, for example, a polyurethane prepolymer. The starting components for preparing such polyurethane prepolymers, such as polyols, isocyanates and catalysts, are very well known in polyurethane chemistry.

The sealants according to the invention are moisture-curing. In order to prevent premature curing before application, the sealants are therefore stored in impermeable containers, for example in aluminium or plastics cartridges, with the exclusion of moisture.

The vitreous filler used according to the invention preferably has a wide melting range of approximately 300° to 900° C. and serves to improve the properties of the sealant as a fire barrier in the event of fire. Glass frit materials are especially suitable for this purpose, a glass frit material having a melting range of about 350° to 700° C. being especially preferred. Such vitreous fillers having a wide melting range are available commercially, for example under the tradename "Ceepree" for a glass frit material having a melting range of 350°–700° C., which devitrifies above 800° C. and forms a fireproof barrier layer.

Suitable intumescent agents are the substances conventionally used, for example, ammonium polyphosphate, expandable graphite. dicyandiamide, melamine and its derivatives, such as melamine phosphate, melamine resins or melamine cyanurate, guanidine salts and cyanuric acid derivatives. Especially advantageous results are obtained with ammonium polyphosphates. These are compounds of the general formula $(NH_4PO_3)_n$ where $n=20-1000$ and molecular weights of approximately 2000 to 100,000. Such compounds are also available commercially, for example under the name Phos-chek.

The intumescent agents are suitably used in a quantity of approximately 2 to 10% by weight and the vitreous filler in a quantity of approximately 5 to 15% by weight, in each case based on the total weight of the sealant.

Surprisingly, it is possible according to the present invention to obtain a storage-stable one-component sealant based on polyurethane if the intumescent agent and the vitreous fusible filler are subjected to a pretreatment by reaction with an isocyanate having a functionality of at least 2 before being mixed with the polyurethane binder. It is assumed that the reactive surfaces of the intumescent agent and the filler are blocked or desactivated by this pretreatment. The term "isocyanate having a functionality of at least 2" here is taken to mean isocyanates having 2 or more isocyanate groups per molecule. Suitable isocyanates for this reaction are conventional diisocyanates and low molecular-weight polyisocyanates, aromatic diisocyanates such as diphenylmethane 4,4'-diisocyanate (MDI), toluylene diisocyanate (TDI) and derivatives thereof being especially preferred.

The invention likewise relates to a process for preparing a one-component sealant of this type, which is characterised in that an intumescent agent and a vitreous fusible filler are reacted with an isocyanate having a functionality of at least 2 and the components thus pretreated are mixed with a polyurethane binder and, if required, conventional additives.

Conventional additives which can be added to the sealant according to the invention are, for example, thickening agents, such as bentonite or silicic acid, pigments, such as titanium dioxide, flame retardants, such as antimony trioxide, fillers such as chalk or silicates and the like.

The one-component sealant according to the invention is a very effective fire barrier in openings and joints in construction parts. Furthermore it has the advantages of a moisture-curing one-component sealant, such as simple application, outstanding mechanical properties, such as low modulus, high extensibility and elastic recovery, good adhesion to many substrates and good weather resistance.

The invention is explained in greater detail in the following examples, where all parts are indicated by weight.

COMPARATIVE EXAMPLE 1

The following basic formulation is used:

| | | |
|---|---|---|
| 1. | Titanium dioxide | 8.0 |
| 2. | Diisodecyl phtalate | 21.0 |
| 3. | Chalk (ground; dried for 24 hours at 130° C.) | 30.0 |
| 4. | PVC powder/emulsion polymer | 10.0 |
| 5. | Prepolymer (45.73% polyether diol* 43.45% polyether triol** and 10.8% TDI, free NCO = 440 mVal/kg | 30.0 |
| 6. | Tosyl isocyanate | 0.5 |
| 7. | Adhesion promoter (Union Carbide Silane A 187) | 0.4 |
| 8. | Dibutyltin dilaurate | 0.1 |

*Molecular weight approximately 2000, based on polypropylene glycol.
**Molecular weight approximately 4000, based on polypropylene glycol.

Components Nos. 1 to 5 are homogeneously mixed with stripper in a vacuum dissolver, then component No. 6 is added and mixed for a further 15 minutes. Finally components Nos. 7 and 8 are added and the mixture is mixed under vacuum for 10 minutes and degassed.

COMPARATIVE EXAMPLE 2

Components Nos. 1 to 5 from Comparative Example 1 are mixed together with 5.0 parts of ammonium polyphosphate, the rest of the procedure being as in Comparative Example 1.

COMPARATIVE EXAMPLE 3

To components Nos. 1 to 5 from Comparative Example 1 are added 5.0 parts of ammonium polyphosphate and 10.0 parts of a commercial glass frit material (melting range 350°–700° C., dried for 24 hours at 130° C.), the rest of the procedure being as in Comparative Example 1.

EXAMPLE 1

To components Nos. 1 and 2 from Comparative Example 1 are added:

5.0 parts of ammonium polyphosphate, 10.0 parts of a commercial glass frit material (melting range 350°–700° C., dried for 24 hours at 130° C.), 1.0 part of a commercial aromatic diisocyanate*

0.02 part of dibutyltin dilaurate (* an 80:20 mixture of MDI and the uretonimine derivative of MDI, i.e. the cyclo adduct of MDI to the carbodiimide of the MDI

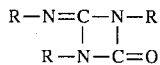

where R=$C_6H_4$–$CH_2$–$C_6H_4$NCO).

Mixing is continued slowly for one hour at 60° to 70° C. in order to complete the reaction. After cooling to 45° C. components Nos. 3 to 5 according to Comparative Example 1 are added, the rest of the procedure being as in comparative Example 1.

EXAMPLE 2

To components Nos. 1 and 2 from Comparative Example 1 are added:

3.0 parts of ammonium polyphosphate 10.0 parts of a commercial glass frit material (melting range 350°–700° C., dried for 24 hours at 130° C.), 0.8 part of MDI (flakes)

0.02 part of dibutyltin dilaurate.

The rest of the procedure is as in Example 1.

EXAMPLE 3

To components Nos. 1 and 2 from Comparative Example 1 are added 5.0 parts of melamine cyanurate 10.0 parts of a commercial glass frit material (melting range 350°–700° C., dried for 24 hours at 130° C.), 1.0 part of a commercial aromatic diisocyanate (as in Example 1)

0.02 part of dibutyltin dilaurate.

The rest of the procedure is as in Example 1.

Testing the effectiveness as a fire barrier:

Test specimens (12×12×15 mm, between concrete) are prepared from the sealants according to Comparative Examples 1 to 3 and Examples 1 to 3 and stored at room temperature for 4 weeks. A Simmon-Müller furnace is heated to ≧1000° C. The cover of the furnace has a gap of approximately 12×50 mm. In each case one test specimen is fixed over this gap so that the sealant closes the gap (test joint). The time for which the gap remains closed, that is to say until the sealant "burns through", is recorded. The results are shown in the table below.

Testing the storage stability:

The sealants prepared according to Comparative Examples 1 to 3 and Examples 1 to 3 are filled into cartridges. The viscosity is determined 4 hours after preparation ($\eta 1$).

One further cartridge in each case is stored for 4 weeks at 40° C. After this time the viscosity of the stored specimen is determined again. The ratio $\eta 2/\eta 1$ serves as a measure of the storage stability. The results are also shown in the table below.

TABLE

| Example | Compa 1 | Compa 2 | Compa 3 | 1 | 2 | 3 |
|---|---|---|---|---|---|---|
| Fire barrier (time until failure) | 20 min | 40 min. | >2 h | >2 h | >2 h | >2 h |
| Storage stability ($\eta 2/\eta 1$) | 1.5 | gelled | gelled | 1.8 | 1.7 | 2.0 |

I claim:

1. An intumescent one-component sealant comprising a polyurethane binder, an intumescent agent, a vitreous fusible filler and wherein the intumescent agent and the vitreous filler have been pretreated by reaction with an isocyanate having a functionality of at least 2.

2. The sealant of claim 1 wherein the intumescent agent is an ammonium polyphosphate.

3. The sealant of claim 1 wherein the vitreous filler has a melting range of about 300° to 900° C.

4. The sealant of claim 1 wherein the vitreous filler has a melting range of about 350° to 700° C.

5. The sealant of claim 1 wherein the vitreous filler is a glass frit material.

6. The sealant of claim 3 wherein the vitreous filler is a glass frit material.

7. The sealant of claim 1 wherein the intumescent agent is present in a quantity of about 2 to 10% by weight, based on total weight of the sealant.

8. The sealant of claim 1 wherein the intumescent agent is present in a quantity of about 5 to 15% by weight, based on total weight of the sealant.

9. The sealant of claim 1 wherein the isocyanate is an aromatic isocyanate.

10. The sealant of claim 9 wherein the aromatic isocyanate is selected from the group consisting of diphenylmethane 4,4'-diisocyanate and toluene diisocyanate.

11. The sealant of claim 1 wherein the sealant further comprises one or more additives selected from the group consisting of thickening agents, pigments, flame retardants and fillers.

12. A process for preparing an intumescent one-component sealant comprising reacting an intumescent agent and a vitreous fusible filler with an isocyanate having a functionality of at least 2, and mixing the thus pretreated components with a polyurethane binder; wherein the one-component sealant further comprises one or more additives selected from the group consisting of thickening agents, pigments, flame retardants and fillers.

13. The process of claim 12 wherein the sealant further comprises one or more additives selected from the group consisting of thickening agents, pigments, flame retardants and fillers.

14. A method of sealing openings and joints in construction parts, comprising:

applying to an opening or joint of a construction part an intumescent one-component sealant comprising a polyurethane binder, an intumescent agent, a vitreous fusible filler and wherein the intumescent agent and the vitreous filler have been pretreated by reaction with an isocyanate having a functionality of at least 2.

15. The method of claim 14 wherein the sealant is a fire barrier.

* * * * *